Dec. 31, 1940.　　W. E. SWENSON　　2,226,595
POWER PLANT
Filed July 25, 1938　　4 Sheets-Sheet 2

Inventor
WILLIAM E. SWENSON
By Andrew E. Carlsen
Attorney

Dec. 31, 1940. W. E. SWENSON 2,226,595
POWER PLANT
Filed July 25, 1938 4 Sheets-Sheet 3
Fig. 4.
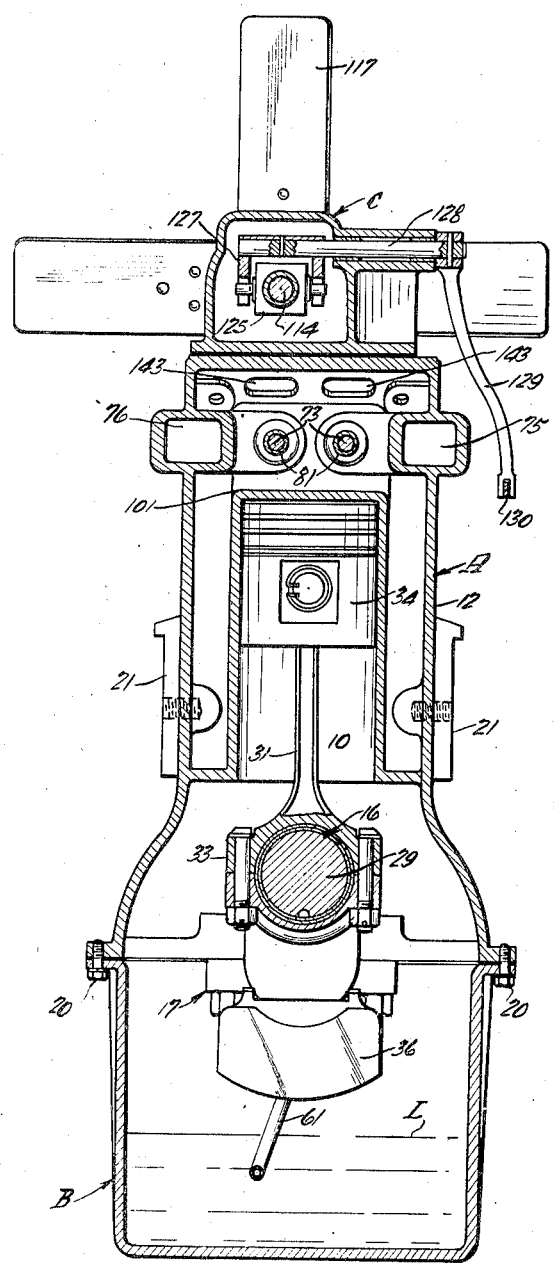
Fig. 5.
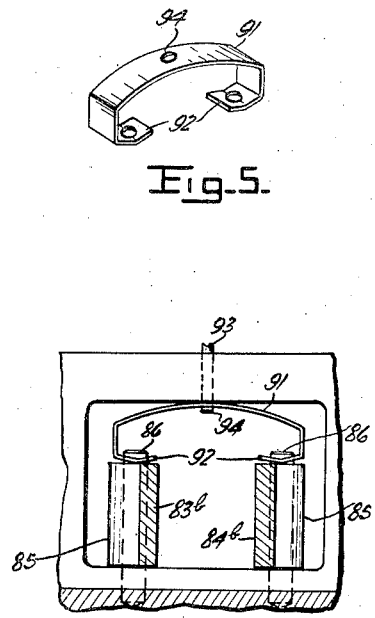
Fig. 6.
Fig. 7.
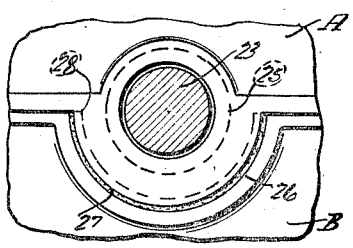
Inventor
WILLIAM E. SWENSON
By Andrew E. Carlsen
Attorney Dec. 31, 1940.　　　　W. E. SWENSON　　　　2,226,595
POWER PLANT
Filed July 25, 1938　　　　4 Sheets-Sheet 4
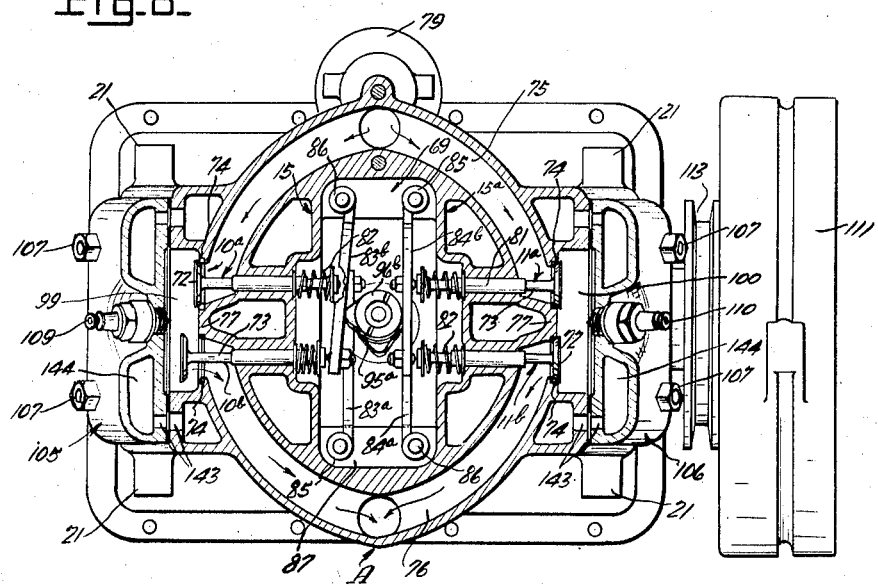
Fig.8.
Fig.9.
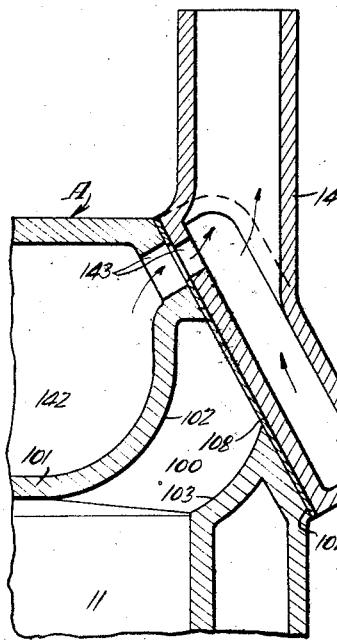
Fig.10.
Inventor
WILLIAM E. SWENSON
Andrew E. Carlsen
Attorney Patented Dec. 31, 1940

2,226,595

UNITED STATES PATENT OFFICE 2,226,595

POWER PLANT

William E. Swenson, Minneapolis, Minn., assignor to Minneapolis-Moline Power Implement Company, Minneapolis, Minn., a corporation of Delaware Application July 25, 1938, Serial No. 221,064

3 Claims. (Cl. 123—195)

This invention relates to improvements in power plants of the internal combustion type.

The primary object of the invention is to provide an internal combustion engine or power plant in an extremely simple, rugged, and inexpensive form and which embodies a compact and centralized assembly of its working parts about a substantially vertically axised shaft which is directly driven by the crankshaft and in turn drives the oil pump, valve actuating cams, and ignition distributor to thus effect a further reduction of parts required to support and actuate these elements. As a result of this assembly and arrangement, an engine of narrow and slender form is provided and which therefore is well suited to use on tractors where it will allow very narrow hoods to be employed with a resulting increase in visibility ahead of the tractor. The engine, however, is not limited in its field of usefulness to tractor work, and may be used wherever an engine having the desirable features of compactness, simplicity, inexpensiveness, and capacity for continuous heavy duty operation may be required.

A further object is to provide an engine of this character having a novel cylinder block and cylinder head assembly embodying a single block or casting for all the cylinders, valve mountings, and crankshaft mountings, and with individual manifolding caps or covers for each cylinder. The valves are then arranged in the block on horizontal axes at right angles to the cylinders and opening into combustion chambers which communicate with the cylinders and in turn open outwardly through the cap receiving face of the block. The valves may thus be serviced or ground from the side and without removing any overhead parts. The caps or covers are affixed to the block in a plane extended at an actute angle to the axes of the cylinders and support the spark plugs in best position for firing the combustible mixture in the combustion chambers. The combination and coordination of these parts as described also provides a combustion chamber of highly efficient form which prevents pumping losses, provides for controlled turbulence at all times, prevents detonation and provides further refinements in operation, as will hereinafter be described in detail.

Still a further object of the invention is to provide an improved engine assembly wherein only a single "running" seal is required at the crankshaft, thus facilitating maintenance of a tightly sealed crank case and preventing leakage. This arrangement is made possible by the aforesaid central location of the shaft driving the oil pump, valve cams, and other parts and its connection direct to the crankshaft in such manner that only the one driving end of the crankshaft need be extended exteriorly of the engine.

These and other more detailed and specific objects will be disclosed in the course of the following specification, reference being had to the accompanying drawings, in which—

Fig. 4 is a vertical cross section along the line 4—4 in Fig. 1, the piston and connecting rod assembly being, however, shown as at the limit of their upward stroke.

Fig. 5 is a perspective view of the retainer spring for the valve actuating rockers or levers.

Fig. 6 is an enlarged, fragmentary section along the line 6—6 in Fig. 2, showing the manner in which the spring of Fig. 5 retains the valve rockers or levers in place.

Fig. 7 is a fragmentary cross section along the line 7—7 in Fig. 1.

Fig. 8 is a horizontal section taken along the line 8—8 in Fig. 1.

Fig. 9 is an enlarged, fragmentary cross section through an upper portion of the cylinder block and showing the valve rockers or levers for one cylinder and their relation to the valves and other parts.

Fig. 10 is an enlarged fragmentary section through one cylinder cap or cover and adjacent parts of the cylinder block, showing also the water outlet of the cooling system.

Figure 1:
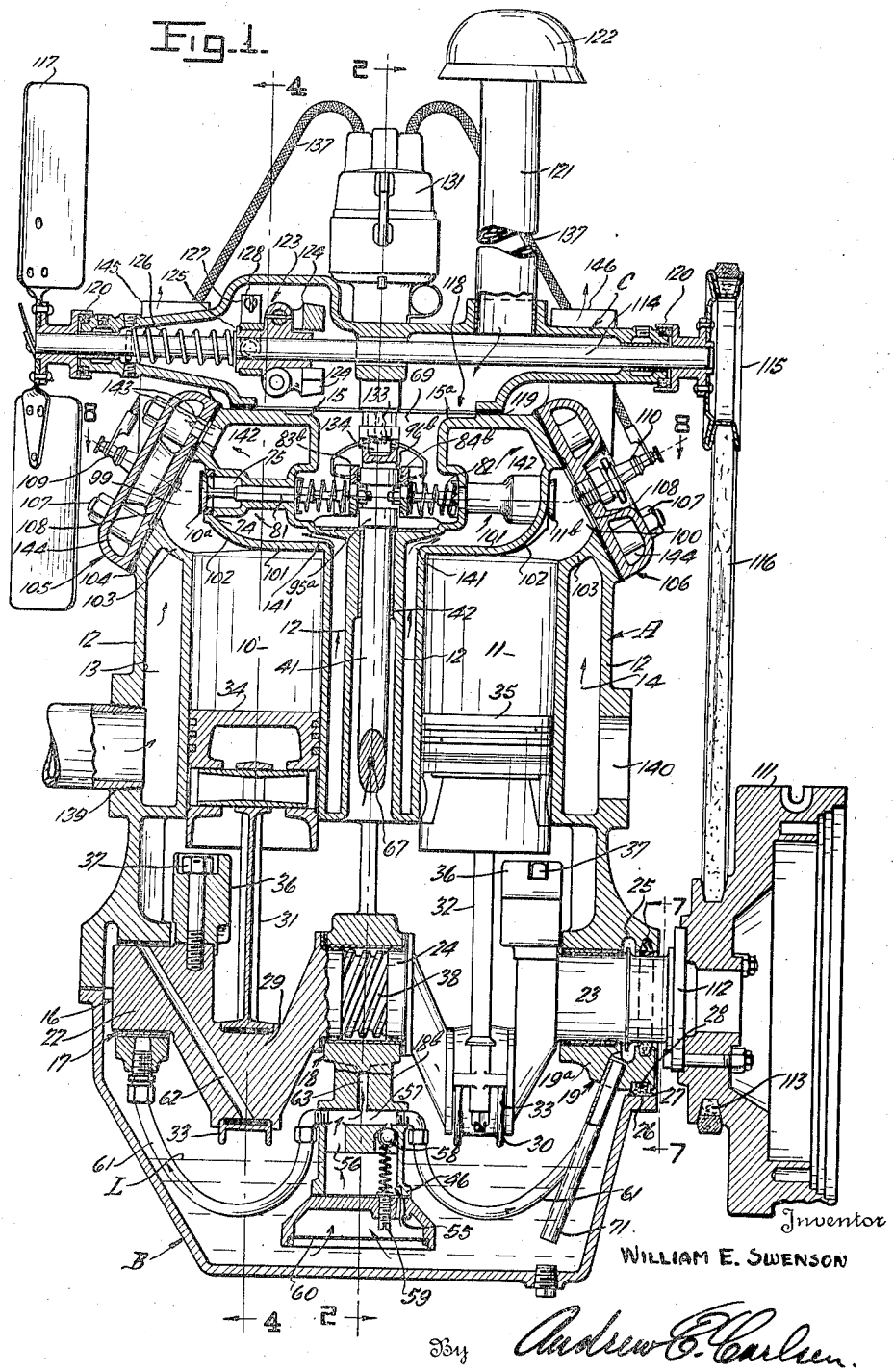
Fig. 1 is a vertical section through my improved engine assembly, taken along the line of the crankshaft and in a plane cutting the cylinders and cylinder block medially, but with certain parts shown in elevation.

Referring now more particularly and by reference characters to the drawings. A designates the main body portion or cylinder block of the engine which is cast in one piece and forms the main supporting structure of the entire assembly. This block or casting thus includes the cylinders 10 and 11, the water jacket walls 12 surrounding the cylinders and defining water circulating chambers 13 and 14, and the upper chambered valve housings 15 and 15a. At the lower end of the block A the crankshaft 16 is mounted and the same is supported and journaled in bearings 17, 18, and 19, to rotate in a plane extended beneath the lower ends of the cylinders, and of course, at right angles to the axes of the cylinders. The crankshaft and lower parts of the engine are enclosed by the downwardly removable oil pan or crank case B which is secured by cap screws 20 to the block, and the various ignition accessories and the cooling fan are mounted atop the block as will presently be described. The block A may have extended cast mounting brackets 21 at its sides for mounting the engine, and it will be evident that, when supported from these brackets, the engine may be serviced from either top or bottom without dismounting, since all parts are mounted on and connected to the main body block as described.

The crankshaft 16 has the end journals 22 and 23, and a center journal 24, which are mounted through the bearings 17, 18, and 19 respectively, and are retained in place by the removable caps of the said bearings. It will be noted that the frontal end of the crankshaft terminates entirely within the confines of the block A and crank case or oil pan B instead of extending forwardly therethrough as is the conventional practice. This eliminates one running seal from the assembly and prevents any possibility of leakage around the crankshaft at this point. The rear end of the crank shaft must, however, extend exteriorly from the engine, and oil sealing rings 25 are provided in the rear bearings 19 in order to prevent leakage at this point. This is obviously the only "running" seal in the entire crank case and block assembly. The rear bearing cap 19a is removably supported from the block A (by cap bolts in usual manner) and forms no part of the oil pan. Instead, the rear wall of the oil pan has a semi-circular notch 26 to receive the cap 19a and the cap is provided with a semi-circular resilient sealing gasket 27 located in a groove 28 to bear against the widened face of the notch 26 to seal the crank case of the engine. However, no wear can occur on this seal, since no moving parts are involved.

The cranks or offset journals 29 and 30 of the crankshaft 16 are spaced between the end and center bearings and in line with the axes of the cylinders 10 and 11 so that the connecting rods 31 and 32 may be journaled on the crankshaft, as indicated at 33, and extended upwardly into the cylinders for connection to the pistons 34 and 35 in usual manner. It will be noted that the journals 29 and 30 are both located or offset on the same side of the crankshaft and the pistons 34 and 35 will accordingly move in unison in the cylinders as will hereinafter be pointed out. The crankshaft is counterbalanced by weight blocks 36 secured by screws 37 to the end cheeks of the shaft and extended radially and oppositely from the journals 29 and 30.

The center journal 24 of the crankshaft is cut to provide teeth for a drive gear 38, and the center bearing cap 18a is recessed out as at 39 to receive a complementary driven gear 40, supported in mesh with the aforesaid gear and adapted to be rotated thereby as the crankshaft turns. An elongated drive shaft 41 is journaled through bushings 42 and 43 which are pressed in openings 44 formed in the block A, and this shaft extends through and is secured at its lower end to the driven gear 40. The said drive shaft 41 is substantially vertically axised in the block A but, due to its being offset laterally at its lower end to fit the gear 40 to the drive gear 38, the shaft is necessarily inclined upwardly toward the opposite side in order to extend at its upper end medially between the valve housings 15 and 15a. This is clearly shown in Figs. 1 and 2, and the shaft is seen to extend between the cylinders 10 and 11 entirely clear of any interference with the connecting rods or other moving parts.

The center bearing cap 18a is retained in place by downwardly removable cap screws 45, and this cap has a depended, integral extension 18b in alignment with the axis of the drive shaft 41. At its lower end this extension is enlarged, recessed, and flared out to provide an oil pump housing 46 in which the meshed oil pumping gears 47 and 48 are fitted and retained by a lower closure plate 49. A bore 50 extends from the recess 39 down into the gear chamber of the pump housing, and a short pump shaft 51 is journaled in this bore and keyed at its lower end to one gear 49 while being releasably connected at its upper end to the drive shaft 41 by means of a key 52 formed on the drive shaft and engaging a notch 53 in the upper end of the pump shaft. The other pumping gear 48 is journaled on a short idler shaft 54, and the two gears are, of course, rotated as the engine operates through the action of the drive shaft 41 and pump shaft 51. Oil from the oil pan B enters the oil pump through a port 55 in the closure plate 49, and is ejected under pressure by the gears, in well known manner, through the outlet port 56 into a cross chamber 57 in the housing 46. Excess pressure in this chamber, or in any part of the lubricating system communicating therewith, is relieved by a spring pressed, ball check valve 58, and will flow back to the intake side of the pump. The pressure required to effect the valve 58 may be adjusted by the screw 59. The closure plate 49 is flared downwardly and carries a filtering screen 60 to filter out impurities from the oil taken up by the pump.

Oil is carried to the end bearings 17 and 19 by tubes 61 leading from the chamber 57 to the bearing caps and diagonally extended passages, one of which is shown at 62, cut in the crankshaft, conduct oil to the crank journals 29 and 30. Oil is also carried from the pump upwardly through a passage 63 into the recess 39 to lubricate the center bearing 18 and the gears, and this oil also moves upwardly through a port 64 into a laterally opening bore 65 to which connection is made at 66 running to an oil pressure gauge (not shown). The drive shaft 41 has an axially extended passageway or bore 67 and oil is injected into this bore through radially extended ports 68 formed in the shaft and its lower bushing 43. This injection of oil occurs periodically and once each revolution of the drive shaft, and the amount of oil thus taken upwardly through the drive shaft may be varied and initially predetermined by proper selection of size for the ports 68. At the upper end of the drive shaft the oil is discharged in an outwardly directed spray by centrifugal force, and bathes the interior of the chamber 69 between the valve housings 15 and 15a to thus continuously lubricate parts therein, and the excess oil is returned to the oil pan B via the opening 70 adjacent the upper drive shaft bushing 42. Excess oil from the end bearing 19 is returned to the crank case through the pipe 71.

It will be noted that the entire oil pump assembly may be removed and withdrawn from the engine simply by removing the two cap screws 45 and also that, when this pump is thus detached, the drive shaft 41 may also be pulled clear from the engine. The use of a single running seal prevents or reduces the possibility of leakage. In furtherance of this object of preventing possible leakage the oil level measuring "bayonet" or rod 147 is mounted through an opening 148 in the block A entirely clear of any connection with the crank case oil pan B, and a considerable distance above the normal oil level L.

Each cylinder 10 and 11 is, of course, provided with its individual intake and exhaust valves arranged above the cylinders in communication therewith and controlling the intake of the combustible mixture, and the exhaust of burnt gases. The intake valves for the cylinders are designated at 10a and 11a and the exhaust valves at 10b and 11b and are of more or less conventional type having the beveled heads 72 and extended elongated stems 73. The valve seats 74 for the various valves are formed in the vertical front and rear faces of the housings 15 and 16, and the stems 73 are extending inwardly and horizontally into the chamber 69 between said housings. The two intake valves 10a and 11a are located toward the same side of the engine in axial alignment, and in spaced parallel relationship, with the two exhaust valves 10b and 11b, similarly arranged but toward the opposite side.

Figure 2:
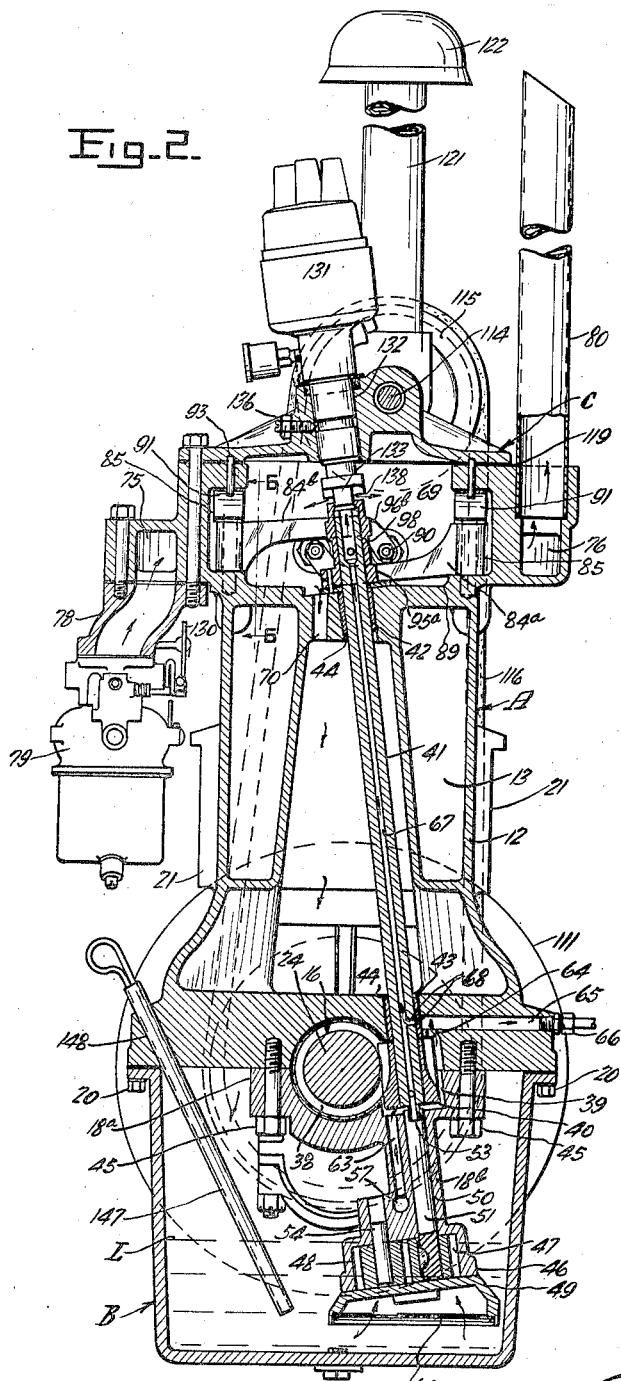
Fig. 2 is a vertical cross section along the line 2—2 in Fig. 1.
Figure 3:
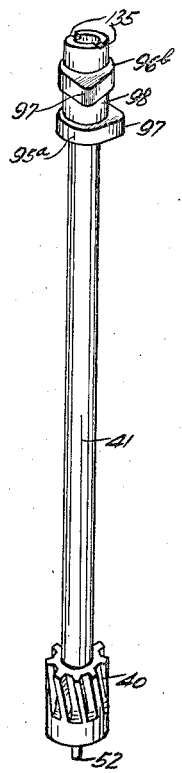
Fig. 3 is a detached and slightly enlarged perspective view of the driving shaft, its pinion and the valve actuating cams.

The intake valve seats communicate inwardly with the opposite ends of an arcuate intake manifold, or a passageway 75 and the exhaust valve seats similarly communicate with the ends of the oppositely located, arcuate exhaust manifold or passageway 76. These manifolds 75 and 76 are cored out, or formed in, the cylinder block A and intervening wall portions 77 isolate the manifolds from each other. From a central portion of the intake manifold 75 a short coupling sleeve 78 is depended to connect the outlet of the carburetor 79 to the manifold and supply the combustible mixture to the cylinders under control of the valves. The exhaust gases from the cylinders are ejected from the manifold 76 by an exhaust pipe 80 connected to a midpoint of the manifold, as shown in Fig. 2. Of course all communication between the manifolds and the cylinders is normally closed, and is at all times controlled, by the intake and exhaust valves.

The valve stems 73 extend inwardly through guides 81 and expansion coil springs 82 are conventionally arranged on the valves to normally urge the valves to their seats. The inner ends of each pair of valve stems will thus normally stand in transverse alignment and equally spaced about the upper end portion of the drive shaft 41. Valve operating levers or rockers are provided for the operation of the valves, and accordingly there are four of these levers, each pivotally mounted on vertical axes at their outer ends and brought into individual engagement at their inner ends with their respective valves. The intake valve operating levers are designated at 83a and 84a while the exhaust valve operating levers are indicated at 83b and 84b. Each lever has an outer widened and bored end 85 adapted to pivotally fit over dowel pins 86 pressed vertically in the block A and located in outward extensions 87 of the chamber beneath the overhanging shoulders 88. The two levers 83a and 84a are located in parallelism on the same side of the engine and extend inwardly on opposite sides of the shaft 41 close to the lower face 89 of the chamber 69 to their extremities where they are turned upwardly into alignment with the ends of the intake valve stems. The levers 83b and 84b are also located in parallelism upon the opposite side of the engine and extend inwardly past opposite sides of the shaft 41 above the intake valve assemblies. The ends of these levers 83b and 84b are then turned downwardly to come into alignment with the exhaust valve stems. The two sets of valve levers are thus allowed to operate one over the other in the same vertical plane, and this without any interference whatever. The inner ends of the levers carry adjustable tappets, designated generally at 90, which actually contact the valve stems.

The two intake valve levers 83a and 83b are retained in place upon the pins 86 by means of the bowed spring 91 which bears at its center against the underside of the overhead shoulder 88 and has its apertured ends 92 turned inwardly to fit over the upper ends of the pins and yieldably press the levers downwardly to position. A small index pin 93 is placed in the said shoulder 88 and engages an aperture 94 in the spring to retain the same in place. The exhaust valve levers 83b and 84b are mounted in identical manner, and it will be evident that this assembly reduces the cost and number of parts necessary to support the levers and greatly facilitates removal and replacement thereof.

Cams 95a and 96b are mounted upon the upper end of the drive shaft 41 to rotate therewith, and the two cams are spaced apart vertically so that the lowermost, or intake cam 95a, will fall in alignment with the intake valve levers 83a and 84a and the uppermost or exhaust cam 96b will stand in alignment with the exhaust valve levers 83b and 84b. These cams are of such diameter that they will turn freely between the various levers, but the lobes or noses 97 are radially extended so that, as they move into engagement with the levers, the levers will be urged outwardly away from the shaft 41 and the valves associated with these operated levers will be opened. One exhaust valve 10b is shown as opened in this manner in Fig. 8. The cams may be joined by an integral sleeve 98 which is releasably pinned, or otherwise attached, to the shaft, and the cams are so "timed" or arranged on the sleeve and shaft that their noses 97 are just ninety degrees apart. Thus, as the drive shaft is rotated, the cams will cause the regular and periodic opening of all the valves in the proper sequence and with proper intervals between each opening, as will be hereinafter apparent.

Attention is now directed to the combustion chamber arrangement and configuration, wherein all parts are so arranged and formed as to secure the maximum of efficiency in this most vital part of the engine.

The combustion chambers (one for each cylinder 10 and 11) are designated generally at 99 and 100, and it will be noted that they are offset forwardly and rearwardly, or horizontally, from the axes of their respective cylinders. The valve housings 15 and 15a overhang the cylinders to support the valves 10a, 11a, 10b, and 11b, at the upper portions of the combustion chambers, and it will be noted that the valve heads and seats actually are disposed immediately over the cylinders and in direct line communication therewith. The lower walls 101 of the valve housings 15 and 15a extend horizontally for some distance forming overhanging heads over part of the cylinders, and then sweep gradually and arcuately upward toward the valve seats, as designated at 102. The upper margins of the chambers 13 and 14 are closed between the cylinders and the walls 12 by the connecting integral webs or walls 103, and these are given an arcuate or concaved shape on their upper surfaces complementary to the curvature of the walls 101, just described. At the upper extremities (forwardly and rearwardly) the combustion chambers open out through the sloped or inclined plane faces 104 of the block A, and to enclose the chambers I then provide water manifolds, caps or covers, designated generally at 105 and 106 which are removably mounted flatly against the block and secured by studs and nuts 107. The inner plane faces 108 of these caps 105 and 106 thus close the combustion chambers, and it will be noted that these caps are disposed at acute angles with respect to the axes of the cylinders 10 and 11 so that their inner faces exposed to the combustion chambers incline downwardly and away from the valves and to the concaved combustion chamber surfaces at 103.

The combustion chambers thus formed may be roughly described as being of "tear drop" shape, and afford the advantageous features and effects in operation as heretofore set out. The operation, with particular reference to the so-called pumping or admission of the combustible mixture, is especially carried out in an effective manner. The gases entering through the opened intake valve thus may flow in part directly to the cylinder, since the valves overhang the cylinder in straightline (vertically) communication therewith and with no intervening obstructions whatsoever, and in part the gases may impinge the straightline faces of the caps 105 and 106 to be guided thereby into contact with the concaved surfaces 103 by which they are swept smoothly into the cylinder. Any tendency of the gases to "pocket" or form stagnant eddies in the combustion chambers is thus entirely avoided, and this effect occurs solely as a concomitant result of the peculiar and novel shape of the chambers and relative angular positions of the caps 105 and 106 and the various valves.

It may possibly be considered, upon only cursory examination, that the relative shapes and angles here involved, are merely matters of degree. Such is not the case, however, since any deviation in these factors completely destroys the effect and robs the combustion chambers of their advantageous features. For example, it might be assumed that the caps 105 and 106 would better serve their purposes should they be oppositely inclined or supported at obtuse angles relative to the cylinders, or that the surface 103 contiguous to these caps might be either plane or convexed, but all such variations would necessarily cause the formation of pockets of stagnant gases with resulting ineffective operation of the engine as a whole.

The ignition of the gases in the combustion chamber is accomplished by spark plugs 109 and 110 mounted centrally through the caps 105 and 106 and at right angles to the plane inner faces 108 thereof. The ignition thus occurs at the best point in the entire combustion chamber to facilitate the proper flame spread and direct the maximum expansive force of the ignited gases upon the pistons. The combustion chambers as here provided also lend themselves exceptionally well to complete scavenging upon exhaust strokes, and in general carry out and meet to best effect the desirable characteristics of operation hereinbefore set forth.

It might be added, with regard to the factor of compression ratio, that the pistons 34 and 35 only just clear the overhanging head walls 101 on the upward limit of their strokes, so that practically the entirety of the gases are compressed in the combustion chambers per se. As the pistons move upwardly on their compression strokes, the gases will impinge the curved surfaces 102 and are given a whirling action in the combustion chambers to cause a maximum of turbulence just prior to the ignition period, as is most desirable.

A flywheel 111 is mounted upon the extended rear end of the crankshaft 16 by bolting it to the flange 112, or by other suitable means, and, in keeping with my stated object of reducing the number of parts employed to an absolute minimum, the fan driving pulley is formed integrally with this flywheel by cutting the belt groove 113 therein, as shown. The fan shaft 114 is journaled along the top of the engine in a housing or casting C, and at one end carries a pulley 115 vertically aligned with the belt groove 113 to receive the fan belt 116 by which the fan shaft is rotated as the engine operates. At the frontal end the fan shaft 114 carries a conventional cooling fan 117.

The engine power is converted into useful work by connecting the fly wheel 111 or the adjacent end of shaft 23 to a drive shaft or to a suitable transmission mechanism in any conventional or desired manner.

The housing or casting C is removably bolted over the top of the cylinder block A and has a medial open portion 118 communicating with the chamber 69. However, the interior of the housing and this chamber are sealed by the gasket 119 and end seals 120 on the fan shaft 114, and the only opening into the housing is through the breather pipe 121 which carries an air filter 122 at its upper end.

The fan shaft 114 carries a governor mechanism 123 adjacent its frontal end, and the same includes the pivotally mounted weights 124 which, when urged outwardly by centrifugal force due to rotation of the shaft, serve to move the block 125 endwise against the tension of an expansion coil spring 126 coiled around the fan shaft. This action swings the fork 127 which is carried by a transversely extended rock shaft 128 journaled through the housing C. This rock shaft carries a radially extended lever 129 at its outer end which is connected to the carburetor 79 by a link 130 so that the governor will control and limit the speed of the engine. This control may be disposed with, when desired, by disconnecting the link from the carburetor.

A distributor 131 of usual form is mounted by its lower end downwardly through an opening 132 in the housing C, so that its driving shaft 133 will fall into alignment with the upper end of the drive shaft 41, with which it is releasably connected by the jaw 134 engaging the notches 135 in the upper end of said drive shaft. The distributor is thus driven in common with the oil pump and valve cams, by this single drive shaft. A lateral screw 136 threaded in the housing C engages the distributor to hold the same in place, but by removing this screw the distributor may be readily removed upwardly from the engine.

The usual external high tension coil (not shown) is connected through the distributor to the spark plugs 109 and 110 via the wires 137, to cause ignition sparks at the plugs in the proper sequence and timing. The distributor is, for this reason, designed according to the speed of the drive shaft, the ratio between the drive shaft and crank shaft, and the position of the cams 95a and 96b, to cause ignition in the combustion chambers in the proper timing, as will be understood.

Attention is directed to the small clearance space at 138 between the distributor and the upper end of the drive shaft, as best shown in Fig.

2. It is through this space that the lubricating oil, working up through the drive shaft, escapes and is discharged by centrifugal force in a spray to properly lubricate working parts at the upper portion of the engine.

Water for cooling the engine (taken from a radiator adjacent the fan 117 in usual manner) is admitted to the chambers 13 and 14 around the cylinders through either or both of the ports 139 or 140, formed in the outer wall 12 of the block A. If either port is not used then it is, of course, closed by a plug (not shown). This water circulates around the cylinders and at the inner upper sides of the chambers 13 and 14 flows through the passageways 141 and into chambers 142 provided in the valve housings 15 and 15a. The water thus circulates around the valves to cool the same, and finally flows through ports 143 in the adjacent faces of the block A, and the caps 105 and 106, into chambers 144 formed in the caps, to thus cool the caps and the spark plugs therein. The water is circulated equally to both caps 105 and 106 and is taken from these caps through integral, upwardly extended nipples or flues 145 and 146 for return to the radiator. A force feed type of circulation may be used if so desired but, in any event, the course of the water through the engine will be seen to be such that all heated parts will be properly and evenly cooled.

It is thought that the operation of the power plant, as thus constructed, will be apparent insofar as the various sequences and cycles of operation are concerned. It may be briefly noted, however, that the cam setting and distributor timing are predetermined in such manner that the valves will be opened and the ignition will occur to urge one piston downwardly by combustion as the other moves downwardly in its suction stroke. The following upward movement of the pistons will then scavenge the burnt gases from the one cylinder while compressing the charge in the other. The mixture in the latter cylinder will then be fired to move the piston downward on its power stroke while the other cylinder is charged with fuel on its suction stroke. The next upward movement of the pistons will scavenge the burnt gases and compress the mixture in the first cylinder ready for firing. The operation is thus repeated continuously so long as the engine is in operation. An important feature of the invention resides in the novel operation of both intake and both exhaust valves with a common cam for each pair of valves, as clearly shown and described. This arrangement facilitates construction and assembly, and makes the "timing" of the valves very convenient to adjust.

It will be evident from the foregoing that I have herein provided an extremely simple, rugged, and compact engine assembly having a number of coordinated, advantageous features resulting in reduction of the number of parts employed, reduction of the leakage, and sealing problem, to a minimum, and improved combustion.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A valve lever mounting for an internal combustion engine which includes a block having recesses for the valve levers and shoulders overhanging the said recesses, valve lever mounting pins in the recesses, valve levers pivotally mounted on the pins, springs including inturned ends for engaging the levers and yieldably retaining them on the pins, the said springs being braced between these ends against the said shoulders and having openings in the portions adjacent the shoulders, and retaining pins in the said shoulders for engaging the said openings in the springs.

2. In a valve lever assembly for an internal combustion engine, a housing having a recess and overhanging shoulder, valve operating levers pivotally mounted about vertical pivot axes in the said recesses, cam actuating means for the levers, and a spring engaging the said valve levers at its ends and upwardly braced against the overhanging shoulder to thereby exert yielding downward pressure upon the pivoted portions of the valve levers and retain the same in place in the recess.

3. In a valve operating assembly for an engine, a housing, valve operating levers pivotally mounted in the housing, cam means for operating the said levers, and spring means removably disposed for engaging the levers and a portion of the housing to normally retain the levers in pivoted engagement with the housing.

WILLIAM E. SWENSON.